(12) United States Patent
Mukherjee et al.

(10) Patent No.: US 8,676,830 B2
(45) Date of Patent: Mar. 18, 2014

(54) KEYWORD RECOMMENDATION FOR INTERNET SEARCH ENGINES

(75) Inventors: Shouvick Mukherjee, Koramangla (IN); Jayesh Vrajlal Bhayani, Saratoga, CA (US); Jagdish Chand, Santa Clara, CA (US); Ravi Narasimhan Raj, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 646 days.

(21) Appl. No.: 10/794,006

(22) Filed: Mar. 4, 2004

(65) Prior Publication Data

US 2005/0198068 A1 Sep. 8, 2005

(51) Int. Cl.
*G06F 17/30* (2006.01)

(52) U.S. Cl.
USPC .......................................................... 707/768

(58) Field of Classification Search
USPC ............................... 707/5, 765–768
See application file for complete search history.

(56) References Cited

U.S. PATENT DOCUMENTS

| | | | | |
|---|---|---|---|---|
| 5,062,074 A | * | 10/1991 | Kleinberger | 707/5 |
| 5,931,907 A | | 8/1999 | Davies et al. | |
| 6,006,225 A | * | 12/1999 | Bowman et al. | 707/5 |
| 6,026,388 A | * | 2/2000 | Liddy et al. | 707/1 |
| 6,144,944 A | * | 11/2000 | Kurtzman et al. | 705/14 |
| 6,144,958 A | * | 11/2000 | Ortega et al. | 707/5 |
| 6,169,986 B1 | * | 1/2001 | Bowman et al. | 707/5 |
| 6,185,558 B1 | * | 2/2001 | Bowman et al. | 707/5 |
| 6,263,355 B1 | * | 7/2001 | Harrell et al. | 708/320 |
| 6,304,864 B1 | * | 10/2001 | Liddy et al. | 706/15 |
| 6,401,084 B1 | * | 6/2002 | Ortega et al. | 707/2 |
| 6,453,312 B1 | | 9/2002 | Goiffon et al. | |
| 6,516,312 B1 | | 2/2003 | Kraft et al. | |
| 6,516,213 B1 | | 5/2003 | Kraft et al. | |
| 6,564,213 B1 | | 5/2003 | Ortega et al. | |
| 6,615,209 B1 | * | 9/2003 | Gomes et al. | 707/5 |
| 6,658,423 B1 | * | 12/2003 | Pugh et al. | 707/102 |
| 6,671,681 B1 | * | 12/2003 | Emens et al. | 707/706 |
| 6,678,690 B2 | | 1/2004 | Kobayashi et al. | |
| 6,681,247 B1 | | 1/2004 | Payton | |
| 6,697,800 B1 | | 2/2004 | Jannink et al. | |
| 6,782,370 B1 | * | 8/2004 | Stack | 705/10 |
| 6,853,993 B2 | * | 2/2005 | Ortega et al. | 707/5 |

(Continued)

FOREIGN PATENT DOCUMENTS

WO   WO 01/46870 A1 * 6/2001 ............. G06F 17/30

OTHER PUBLICATIONS

Dialog Information Services, "DialogOnDisc", Jan. 1992, Version 4.0 for DOS, P. cover, (c), 2-1, 2-2, 3-4, 3-5, 3-10, 3-11, 3-15, 3-19, 4-11, 4-21, 4-22. 4-27, 5-2, 5-8, 5-9, 5-11.*

(Continued)

*Primary Examiner* — Khanh Pham
(74) *Attorney, Agent, or Firm* — James J. DeCarlo; Greenberg Traurig, LLP

(57) ABSTRACT

A computer implemented method of generating keyword recommendations is provided, which includes providing keyword frequency data in computer readable media that indicate frequency counts of keywords used in past internet searches; providing keyword affinity data in computer readable media that indicate affinities between pairs of keywords used in past user internet searches; identifying keywords from the keyword frequency data that include the selected keyword; identifying keywords from the keyword affinity data that have an affinity to the selected keyword; and prioritizing the identified keywords based upon the keyword frequency.

21 Claims, 9 Drawing Sheets

| Keyword | Frequency |
|---|---|
| wisconsin restaurants | 92 |
| washington restaurants | 52 |
| vegetarian | 11030 |
| vancouver restaurants | 314 |
| toronto restaurants | 969 |
| seafood | 7380 |
| resturant guide | 330 |
| restaurants in houston | 92 |
| restaurants in france | 169 |
| restaurants in florida | 80 |
| restaurants in ca | 14 |
| restaurant ratings | 317 |
| restaurant industry | 361 |
| restaurant finder | 179 |
| restaurant companies | 77 |
| pennsylvania restaurants | 150 |
| paris restaurants | 1474 |
| online restaurants | 134 |
| nyc restaurants | 2084 |
| michigan dining | 20 |
| mexican cuisine | 613 |
| mallorca | 6116 |
| houston restaurants | 2921 |
| houston dining | 102 |
| houston | 52088 |

(56) References Cited

U.S. PATENT DOCUMENTS

| | | | |
|---|---|---|---|
| 6,873,996 B2* | 3/2005 | Chand | 1/1 |
| 6,963,867 B2* | 11/2005 | Ford et al. | 707/3 |
| 7,076,483 B2* | 7/2006 | Preda et al. | 707/5 |
| 7,089,237 B2* | 8/2006 | Turnbull et al. | 707/5 |
| 7,124,353 B2 | 10/2006 | Goodwin et al. | |
| 7,146,416 B1* | 12/2006 | Yoo et al. | 707/E17.119 |
| 7,225,187 B2* | 5/2007 | Dumais et al. | 707/5 |
| 7,249,121 B1* | 7/2007 | Bharat et al. | 707/3 |
| 7,424,469 B2* | 9/2008 | Ratnaparkhi | 707/3 |
| 7,617,209 B2* | 11/2009 | Whitman et al. | 707/999.002 |
| 7,676,462 B2* | 3/2010 | Kirkland et al. | 707/999.005 |
| 2002/0032682 A1* | 3/2002 | Kobayashi et al. | 707/5 |
| 2002/0038241 A1 | 3/2002 | Hiraga | |
| 2002/0072895 A1* | 6/2002 | Imanaka et al. | 704/9 |
| 2002/0095409 A1 | 7/2002 | Takahashi et al. | |
| 2002/0194166 A1* | 12/2002 | Fowler | 707/3 |
| 2002/0198882 A1* | 12/2002 | Linden et al. | 707/10 |
| 2003/0014399 A1* | 1/2003 | Hansen et al. | 707/3 |
| 2003/0046080 A1 | 3/2003 | Hejna, Jr. | |
| 2003/0046389 A1 | 3/2003 | Thieme | |
| 2003/0088525 A1 | 5/2003 | Velez et al. | |
| 2003/0195877 A1* | 10/2003 | Ford et al. | 707/3 |
| 2004/0117189 A1* | 6/2004 | Bennett | 704/270.1 |
| 2004/0210600 A1 | 10/2004 | Chand | |
| 2004/0225629 A1* | 11/2004 | Eder | 706/46 |
| 2005/0080764 A1* | 4/2005 | Ito | 707/1 |
| 2005/0192955 A1* | 9/2005 | Farrell | 707/5 |

OTHER PUBLICATIONS

Dialog Information Services, "DialogLink for the Windows Operating System User's Guide", May 1995, Version 2.1, P. title, 1-2, 4-1.*

Calishain, Tara et al., "Google Hacks: 100 Industrial-Strength Tips & Tools", Feb. 2003, First Printing, p. 19-23, 33, 288.* dictionary.oed.com, "Oxford English Dictionary", 1989-1997, Retrieved Sep. 23, 2006, 2nd Ed. P. "cover page", "key", "dates", "crucial".*

M-W.com, "Merriam Webster Thesaurus", cover page archived Feb. 4, 2003, Retrieved Feb. 4, 2003, (hereinafter MWT). (* retrieved from archive.org, Feb. 4, 2003). <*http://web.archive.org/web/20030204132348http://www.m-w.com><http://www.m-w.com>.*

Thomson Products, Extrinsic Evidence of the Common Ownership and Distribution of DialogWeb & DialogOnDisc, Retrieved Sep. 27, 2006, Common point of contact: <http://www.dialog.com/contacts/forms/member.shtml> <http://www.dialog.com/products/plafform/webinterface.shtml> <http://www.dialog.com/products/platform/desktop_app.shtml>.*

Dialog Chronolog, "New Features on DialogWeb(tm)", Publication Sep. 19, 1998, Retrieved by L. Walker on Sep. 27, 2006, p. 1.*

Sherman, Chris, "Google Power, Unleash the Full Potential of Google", Aug. 23, 2005, McGraw-Hill/Osborne.*

Yi Liu et al., "Affinity rank: A New Scheme for Efficient Web Search", May 2004, p. 338-339.*

Salton, Gerard, "Abstracts of Articles in the Information Retrieval Area Selected by Gerard Salton", 1986, ACM Portal, p. 39-50.*

Netcraft, Site Report for "www.dialoweb.com", Published 1998—May 10, 2006, Retrieved Sep. 27, 2006. <http://toolbar.netcraft.com/site_report?url=http://www.dialogweb.com>.*

Thomson Dialog, "DialogWeb Command Search Tutorial", Dec. 10, 2002, Dailog Web Version 2.0, <http://support.dialog.com/techdocs/dialogweb_command_tutorial.pdf#search=%22dialogweb%202002%22>.*

DialogLink, "DialogLink for Windows and Machintosh: User's Guide", Dec. 1993, Version 2.01, P. (cover sheet), (3-11).*

OED.com, "Definition of prescribed", Dec. 2003, <Retrieved Mar. 3, 2008>.*

Sugiura, "Query routing for Web search engines: architecture and experiments", Jun. 2000, Computer Networks 2000, p. 417-429, <Retrieved from www.elsevier.com/locate/comnet>.*

Lam-Adesina et al, "Applying Summarization Techniques for Term Selection in Relevance Feedback", Sep. 9, 2001, SIGIR'01, ACM Press, p. 1-9.*

Hammami et al, "WebGuard: Web Based Adult Content Detection and Filtering System", Oct. 2003, Proceedings of the IEEE/WIC Conference on Web Intelligence (WI'03), p. 1-5, <Retrieved from IEEE Explore Mar. 11, 2009>.*

Genova et al, "Efficient Summarization of URLs using CRC32 for Implementing UURL Switching", Nov. 2002, Proceedings of the 27th Annual IEEE Conference on Local Computer Networks LCN'02, p. 1-2, <Retrieved from IEEE Explore Mar. 11, 2009>.*

International Search Report mailed on Nov. 15, 2004, for PCT patent application No. PCT/US2004/011772 filed Apr. 16, 2004, 3 pages.

Ji, Minwen (2002) "Affinity-Based Management of Main Database Clusters" *ACM Transactions on Internet Technology* 2(4): 307-339.

Liu, Yi et al. (2004) "Affinity Rank: A New Scheme for Efficient Web Search" *ACM* 1-58113-912-8/04/0005: 338-339.

Donath, J.S. et al. "The Sociable Web," located at <http://web.web.archive.org/web/19980216205524/http://judith.www.media> last visited on Aug. 14, 2003, four pages.

Appeal Brief mailed on Mar. 19, 2007, for U.S. Appl. No. 10/607,469, filed Jun. 25, 2003, twenty-nine pages.

Board of Appeals Decision mailed on Jun. 3, 2009, for U.S. Appl. No. 10/607,469, filed Jun. 25, 2003, nine pages.

Final Office Action mailed on Nov. 1, 2006, for U.S. Appl. No. 10/607,469, filed Jun. 25, 2003, eight pages.

Final Office Action mailed on Dec. 29, 2005, for U.S. Appl. No. 10/607,469, filed Jun. 25, 2003, eight pages.

Non-Final Office Action mailed on Sep. 1, 2009, for U.S. Appl. No. 10/607,469, filed Jun. 25, 2003, ten pages.

Non-Final Office Action mailed on Jun. 2, 2006, for U.S. Appl. No. 10/607,469, filed Jun. 25, 2003, five pages.

Non-Final Office Action mailed on May 12, 2006, for U.S. Appl. No. 10/607,469, filed Jun. 25, 2003, seven pages.

Notice of Allowance mailed on Nov. 10, 2004, for U.S. Appl. No. 10/417,709, filed Apr. 16, 2003, eight pages.

M. Balabanovic et al., "Content-Based, Collaborative Recommendation", Communications of the ACM vol. 40, No. 3, Mar. 1988, pp. 66-72.

H. Kawano et al., "Mondou: Web search engine with textual data mining", 0-7803-3905, IEEE, Mar. 1997, pp. 402-405.

M. Tanaka et al., "Intelligent System for Topic Survey in MEDLINE by Keyword Recommendation and Learning Text Characteristics", Genome Informatics 11: 73-82, 2000, pp. 73-82.

* cited by examiner

| Keyword | Frequency |
|---|---|
| wisconsin restaurants | 92 |
| washington restaurants | 52 |
| vegetarian | 11030 |
| vancouver restaurants | 314 |
| toronto restaurants | 969 |
| seafood | 7380 |
| resturant guide | 330 |
| restaurants in houston | 92 |
| restaurants in france | 169 |
| restaurants in florida | 80 |
| restaurants in ca | 14 |
| restaurant ratings | 317 |
| restaurant industry | 361 |
| restaurant finder | 179 |
| restaurant companies | 77 |
| pennsylvania restaurants | 150 |
| paris restaurants | 1474 |
| online restaurants | 134 |
| nyc restaurants | 2084 |
| michigan dining | 20 |
| mexican cuisine | 613 |
| mallorca | 6116 |
| houston restaurants | 2921 |
| houston dining | 102 |
| houston | 52088 |

FIG. 3A

| Keyword | Frequency |
| --- | --- |
| franchise | 40852 |
| fine dining | 1030 |
| diners | 2036 |
| catering | 16198 |
| cafe | 9649 |
| cafe | 444 |
| virginia restaurants | 102 |
| uk restaurant | 172 |
| sushi | 15231 |
| spanish restaurants | 743 |
| sf restaurants | 163 |
| resturants | 11615 |
| restaurants in ct | 48 |
| restaurants in boston | 338 |
| illinois restaurants | 107 |
| Fast food | 12438 |
| dc restaurants | 342 |
| City search | 39794 |
| california restaurants | 471 |
| boston restaurants | 4147 |
| Bay area restaurants | 416 |
| steakhouse | 3333 |
| restaurants in dc | 72 |
| restaurant menus | 3402 |
| restaurant magazine | 384 |
| restaurant jobs | 966 |
| pizza | 34834 |
| ny restaurants | 867 |
| michigan restaurants | 372 |
| maps | 1326684 |
| italian restaurants | 4748 |
| ct restaurants | 92 |
| restaurants, ca | 61 |
| restaurants in illinois | 32 |
| motels | 58606 |
| maryland restaurants | 386 |
| london restaurants | 1652 |
| hawaii restaurants | 151 |
| florida restaurants | 623 |
| restaurants in chicago | 503 |
| vegetarian restaurants | 637 |
| restaurant business | 610 |
| new jersey restaurants | 2092 |
| la restaurants | 248 |
| food | 94620 |
| restaurant management | 1148 |

FIG. 3B

| Keyword | Frequency |
|---|---|
| restaurant equipment | 7774 |
| nj dining | 74 |
| chicago restaurants | 5519 |
| los angeles restaurants | 2704 |
| restaurant directory | 72 |
| nj restaurants | 1193 |
| hotels | 342590 |
| restaurants in california | 105 |
| resturaunt | 103 |
| restaurant association | 306 |
| bars | 23104 |
| seafood restaurants | 2535 |
| restraunt | 804 |
| dining | 5170 |
| restraunts | 3848 |
| restaurant guide | 5409 |

FIG. 3C

| Keyword | Frequency |
|---|---|
| restaurants | 107865 |
| restaurant supplies | 9355 |
| restaurant equipment | 7774 |
| chicago restaurants | 5519 |
| restaurant guide | 5409 |
| new york city restaurants | 5298 |
| restaurant reviews | 5118 |
| italian restaurants | 4748 |
| new york restaurants | 4592 |
| boston restaurants | 4147 |
| restaurant recipes | 4132 |
| chinese restaurant | 4119 |
| mexican restaurants | 3845 |
| san francisco restaurants | 3654 |
| restaurant menus | 3402 |
| new orleans restaurants | 3300 |
| houston restaurants | 2921 |
| used restaurant equipment | 2809 |
| japanese restaurant | 2765 |
| los angeles restaurants | 2704 |

FIG. 4

| Frequency | Keyword |
|---|---|
| 1326684 | maps |
| 342590 | hotels |
| 107865 | restaurants |
| 94620 | food |
| 58606 | motels |
| 52088 | houston |
| 40852 | franchise |
| 39794 | city search |
| 34834 | pizza |
| 23104 | bars |
| 16198 | catering |
| 15231 | sushi |
| 12438 | fast food |
| 11615 | resturants |
| 11030 | vegetarian |
| 9649 | cafe |
| 9355 | restaurant supplies |
| 7774 | restaurant equipment |
| 7380 | seafood |
| 6116 | mallorca |
| 5519 | chicago restaurants |
| 5409 | restaurant guide |
| 5298 | new york city restaurants |
| 5170 | dining |
| 5118 | restaurant reviews |
| 4748 | italian restaurants |
| 4592 | new york restaurants |
| 4147 | boston restaurants |
| 4132 | restaurant recipes |
| 4119 | chinese restaurant |
| 3848 | restraints |
| 3845 | mexican restaurants |
| 3654 | san francisco restaurants |
| 3402 | restaurant menus |
| 3333 | steakhouse |
| 3300 | new orleans restaurants |
| 2921 | houston restaurants |

FIG. 5A

| Keyword | Frequency |
|---|---|
| 2809 | used restaurant equipment |
| 2765 | japanese restaurant |
| 2704 | los angeles restaurants |
| 2646 | philadelphia restaurants |
| 2535 | seafood restaurants |
| 2535 | seafood restaurants |
| 2432 | Atlanta restaurants |
| 2429 | indian restaurants |
| 2313 | las vegas restaurants |
| 2159 | national restaurant association |
| 2092 | new jersey restaurants |
| 2084 | nyc restaurants |
| 2046 | fast food restaurants |
| 2036 | diners |
| 1933 | restaurant coupons |
| 1928 | restaurant furniture |
| 1867 | restaurant franchises |
| 1855 | french restaurants |
| 1797 | dallas restaurants |
| 1665 | restaurants for sale |
| 1660 | san diego restaurants |
| 1652 | london restaurants |
| 1638 | thai restaurant |
| 1590 | chili's restaurant |
| 1550 | islands restaurant |
| 1474 | paris restaurants |
| 1193 | nj restaurants |
| 1148 | restaurant management |
| 1030 | fine dining |
| 969 | toronto restaurants |
| 966 | restaurant jobs |
| 867 | ny restaurants |
| 804 | restraunt |
| 743 | spanish restaurants |
| 637 | vegetarian restaurants |
| 623 | florida restaurants |
| 613 | mexican cuisine |
| 610 | restaurant business |
| 503 | restaurants in chicago |
| 471 | california restaurants |
| 444 | café |
| 416 | bay area restaurants |
| 386 | maryland restaurants |
| 384 | restaurant magazine |
| 372 | michigan restaurants |
| 361 | restaurant industry |
| 342 | dc restaurants |
| 338 | restaurants in boston |

FIG. 5B

| Keyword | Frequency |
|---|---|
| 330 | resturant guide |
| 317 | restaurant ratings |
| 314 | vancouver restaurants |
| 306 | restaurant association |
| 248 | la restaurants |
| 179 | restaurant finder |
| 172 | uk restaurant |
| 169 | restaurants in trance |
| 163 | sf restaurants |
| 151 | hawaii restaurants |
| 150 | pennsylvania restaurants |
| 134 | online restaurants |
| 107 | illinois restaurants |
| 105 | restaurants in california |
| 103 | resturaunt |
| 102 | houston dining |
| 102 | virginia restaurants |
| 92 | wisconsin restaurants |
| 92 | ct restaurants |
| 80 | restaurants in florida |
| 77 | restaurant companies |
| 74 | nj dining |
| 72 | restaurants in dc |
| 72 | restaurant directory |
| 61 | restaurants, ca |
| 52 | washington restaurants |
| 48 | restaurants in ct |
| 32 | restaurants in illinois |
| 20 | michigan dining |
| 14 | restaurants in ca |

FIG. 5C

KEYWORD RECOMMENDATION FOR INTERNET SEARCH ENGINES

BACKGROUND OF THE INVENTION

1. Field of the Invention

The present invention relates in general to search query optimization, and more particularly, to use of prior search data to recommend alternate search queries or keywords or key word phrases to modify or to replace a search query.

2. Description of the Related Art

Today's computer networks allow interconnection of large numbers of information processing systems, storage devices and file servers so that databases can be shared across systems. As a result, users now have immediate access to enormous amounts of information. The internet is a prime example of such a computer network. In order to take advantage of the vast amount of information made available by technological advances, users must be able to identify, locate and retrieve desired information in a timely manner. To do this, information retrieval systems have been developed that allow users to quickly identify, locate and retrieve the best and most relevant information associated with a user request.

In an internet environment, an internet search engine serves as the information retrieval system. A typical internet search engine comprises a program that searches internet accessible documents, such as web pages, for specified keywords or keyword phrases and returns a list of the documents that include the one or more of the keywords or keyword phrases. A search engine generally works by sending out a spider to fetch as many documents as possible. The spider ordinarily includes a program, called an indexer that reads these documents and creates an index based on the words contained in each document. Each search engine uses different proprietary algorithms to create indices such that, ideally, only meaningful search results are returned in response to a user's submission of a keyword-based query. For example, in response to a user's keyword-based search query, a search engine might provide a list of URLs for web pages that contain one or more of the keywords in a user's search query. A Universal Resource Locator (URL) is an address which can uniquely specify a resource accessible via the internet (e.g. http—for web pages, ftp—for file transfers, mailto—for email, etc.).

Selection of optimal keywords or keyword phrases is a central challenge of keyword-based searching for content available on a computer network such as the internet. A keyword is a word used in a search engine query. A keyword phrase is a phrase used in a search engine query. A search engine query comprises a term, or more often, a group of terms or a phrase used by a search engine to find web pages or sites with content and information identified through such query.

For example, computer network users frequently search for information on topics about which they know very little. As a consequence, they often do not know the optimal keywords to use to search for content on a particular topic of interest. A poorly crafted search query may be too incomplete or inaccurate to efficiently locate the information the user really wants. For instance, a search engine may identify hundreds or even thousands of items in response to a broadly worded search query. If a user is performing a search to locate a particular item or set of items, then a search result with hundreds or thousands of items is far from an optimal.

There are numerous prior solutions to the search query formulation problem. For example a prior system has been disclosed to automatically expand a user-provided query string to include terms that do not appear in the query, but which may correspond to or be associated with user-provided query terms. A shortcoming of such automatic query expansion system is that it allows too little opportunity for a user to participate in the query development process.

A prior alternative system that allows user-participation in a search query expansion process takes a user-provided query and uses it to locate a list of matched phrases from a corpus of documents. A user can elect to take words from returned phrases that are not included in the original query to refine the query. This process can be repeated to retrieve documents that are increasingly focused on a desired topic.

A prior alternative system that allows user-participation in a search query refinement process presents takes a query term from a user-provided search query and uses query term correlation data to identify additional query terms that are deemed to be related to the query term. The additional query terms are presented to the user for selection to allow the user to refine the search query. The query term correlation data is developed over time from user search queries and reflects frequencies with which query terms appear together within the same search query.

Unfortunately, emphasis upon identification of related query terms risks missing keyword phrases (comprising more than one term) that may improve upon a search query. For instance, a search query, "new york restaurants" might be improved upon by substituting the search query, "new york city restaurants". Both of these search queries contain the keyword "restaurants", but the latter keyword phrase may improve the search query if the search is directed to finding restaurants in the City of New York.

While earlier query expansion and query completion systems of the general type described above generally have been successful, there have been shortcomings with their use. Specifically, these systems generally infer a relationship between query terms based upon their shared presence or the frequency of their shared presence within a single document or web page or search query. These systems tend to encourage a user to pursue the development or refinement of an initial search query.

As explained above, however, computer network users often search on topics about which they know very little. As a result, an initial search query may be far from optimal and require significant development. Thus, an initial search query may be so poorly formulated to be readily optimized.

Significantly, mere search query refinement is unlikely to correlate alternative search keywords that do not typically occur together, even if it is likely that others interested in the same topic would have searched for it using one or the other of such alternative terms. For example, a person seeking a place to eat while out of town on a trip might enter a search query containing the keyword, "restaurant". That person might not think to enter the keyword, "maps", even though that may be the best way to find a restaurant, since a map's web site might link to local restaurant home pages. The prior search query refinement systems described above are unlikely to make such a restaurant-to-maps keyword correlation.

Thus, there exists a need for an improved system and method for optimal search query selection. The present invention meets this need.

SUMMARY OF THE INVENTION

One aspect of the invention provides a computer implemented method of generating keyword recommendations. Keyword frequency data are provided in computer readable media. The keyword frequency data indicate frequency counts of keywords used in previous internet searches. Keyword affinity data are provided in computer readable media. The keyword affinity data indicate affinities between pairs of keywords used in past user internet searches. The keyword frequency data are searched to identify keywords from the keyword frequency data that include the selected keyword. The keyword affinity data are searched to identify keywords from the keyword affinity data that have an affinity to the selected keyword. The keyword frequency data are used to prioritize the identified keywords.

Another aspect of the invention provides an article of manufacture including computer readable medium encoded with computer readable code. Keyword frequency data indicate frequency counts of keywords used in past internet searches. Keyword affinity data indicate affinities between pairs of keywords used in past user internet searches. Computer code identifies keywords from the keyword frequency data that include a selected keyword. Computer code identifies keywords from the keyword affinity data that have an affinity to the selected keyword. Computer code prioritizes the identified keywords based upon the keyword frequency data.

Yet another aspect of the invention provides a system for enhancing internet searches. An internet search engine can retrieve one or more web pages in response to a user search request that includes a user-indicated keyword. Keyword frequency data in computer readable media indicates frequency counts of keywords used in past internet searches. Keyword affinity data in computer readable media indicates affinities between pairs of keywords used in past user internet searches. A server can search the keyword frequency data to identify keywords from that include the user-indicated keyword. The server can search the keyword affinity data to identify keywords that have an affinity to the user-indicated keyword. The server can prioritize the identified keywords from the frequency data and from the affinity data according to frequency counts indicted by the frequency data.

An embodiment of the invention advantageously provides alternative keyword recommendations based upon a combination of frequency data and affinity data. The frequency data are used to identify possible alternative keywords based upon usage of a selected keyword in prior search requests by others. The affinity data are used to identify possible alternative keywords based upon keywords determined to have an affinity to the selected keyword. The identified keywords from the frequency data and the identified keywords from the affinity data are merged and prioritized based upon the frequency data in order to present them to a user in a convenient useable form.

BRIEF DESCRIPTION OF THE DRAWINGS

FIGS. 3A-3C is an illustrative drawing of a first table of FIG. 2, which contains example frequency data for the example search term "restaurant".

FIG. 4 is an illustrative drawing of the second table of FIG. 2, which contains example affinity data for the example search term "restaurant".

FIGS. 5A-5C is an illustrative drawing of the third table of FIG. 2, which contains example recommended alternative keywords for the example search term "restaurant".

DETAILED DESCRIPTION OF THE PREFERRED EMBODIMENTS

The following description is presented to enable any person skilled in the art to make and use the novel computer implemented keyword recommendation tool of the present invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

An affinity-based search term correlation process produces affinity data that correlates keywords based upon paired associations of search terms with search objects. A keyword is a search term that may consist of a word or a combination of words provided by a user to a search engine to direct an internet-based search. A search object comprises an image on a computer display that can be actuated to access information over a network such as the internet. For example, a search object may be a word, picture, icon or other image, which is associated with a selectable link such as a hypertext link, which in turn, associates the search object with another word, picture, icon or information object, such as a web page. In a multimedia environment such as the World Wide Web, such search objects can be associated with links to sound and motion video sequences. One common form of link is a highlighted word or picture that can be selected by a user (with a mouse or in some other fashion), resulting in the immediate delivery and view of another file. The highlighted object is referred to as an anchor. The anchor reference and the object referred to constitute a hypertext link.

Figure 1:
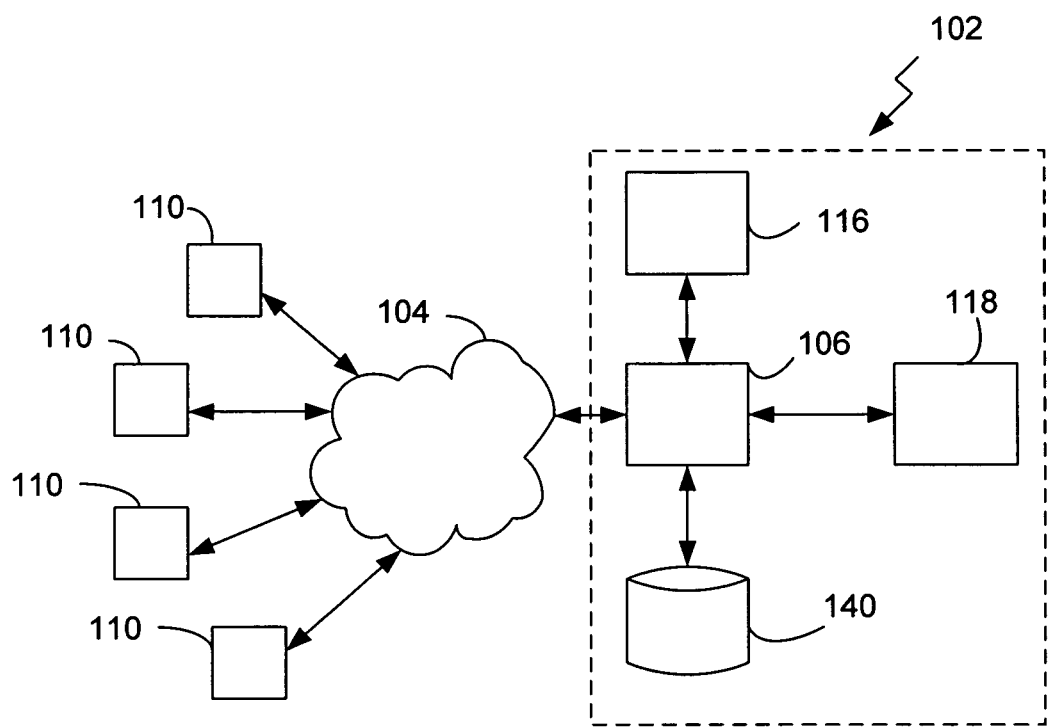
FIG. 1 is an illustrative drawing of a web site through which users can obtain information via the Internet and which illustrates the basic components used to implement a keyword recommendation engine in accordance with an embodiment of the invention.

FIG. 1 is an illustrative drawing of a web site 102 through which users can access information via the Internet 104 and which illustrates the basic components used to implement a keyword recommendation engine in accordance with an embodiment of the invention. A web site is a location on the World Wide Web. Each web site typically contains a home page, which is the first document users see when they enter the site. The site might also contain additional documents and files. Each site ordinarily is owned and managed by an individual, company or organization. A portal is a web site or service that offers a broad array of resources and services, such as e-mail, browsing, forums, search engines, and on-line shopping malls. Originally, web portals were online services that provided access to the web, but more recently, even traditional search engines have transformed themselves into web portals to attract and keep a larger audience. The web site 102 of FIG. 1 may include ample components, such as a search engine capability, to qualify it as a web portal.

The web site 102 includes a web server 106, which is a computer program based process that delivers web pages. A web server is associated with an IP address and possibly a domain name. For example, if user enters the URL, http://www.nameco.com/index.html in a browser, this sends a request to the web server whose domain name is nameco.com. The web server at that domain name then fetches the page named index.html and sends it to the user's browser. Any computer can implement a web server by installing appropriate server software and connecting the machine to the Internet.

The web server 106 communicates with a multiplicity of internet-connected user computer devices over the internet 104, although only four intent-connected computers 110 are shown. The internet-connected computers 110, for example, may be any user devices used to login to the computer and accessing information over the internet from web server 104. Users of internet-connected computers 110 visit web site 102 site to access various information and services, e.g. search, email finance etc. Data collected by web site 102 over the course of a multitude of user visits to the site are used to develop keyword recommendations for Internet searches, as described below.

The web server 106 communicates with an Internet search engine 116, which is a computer program that searches documents for specified keywords and returns a list of web-accessible documents where the keywords were found. The search engine 116 may be accessible over a computer network, for example. Typically, a search engine works by using a type of program called a spider to retrieve as many documents as possible over the web. Another type of program, referred to as an indexer, then parses these documents and creates an index based on the words contained in each document. Each different search engine uses its own algorithm to create its indices such that, ideally, only meaningful results are returned for any given search request.

User search requests received by the web server 104 are processed by a keyword recommendation server 118 in the course of their being passed on to the search engine 116. It will be appreciated that the web server 104 and the keyword recommendation server 118 are software based processes that may run on the same or different computers. The keyword recommendation server 118 suggests alternative keywords in response to a user search request. More particularly, a user of computer 110, for example, may formulate a search query consisting of a collection of words. The user search query is transmitted over the Internet 104 to the web server 106, which passes the search query to the search engine 116 and to the keyword recommendation server 118. The search engine 116 returns to the web server 106 a list of web pages that satisfy the user search query. The keyword recommendation server 118 returns to the web server 106 a collection of alternative keywords as a suggestion to the user of alternative search strategies. The web server 106 delivers to computer 110 via the Internet 104 both the search list of web pages returned by the search engine 116 and the keyword recommendations returned by the keyword recommendation server 118. The user of computer 110 can decide whether or not the search results are adequate and whether to adopt any of the recommended keywords in a follow-up search query.

A log file 140 is used to record activity on the web site 102. For example, the log file may record attributes of user search requests such as user information, URL and IP address, for example. As explained below, with reference to FIG. 2, information in the log file 140 is used to produce a search term frequency database 124 and a search term affinity database 130.

Figure 2:
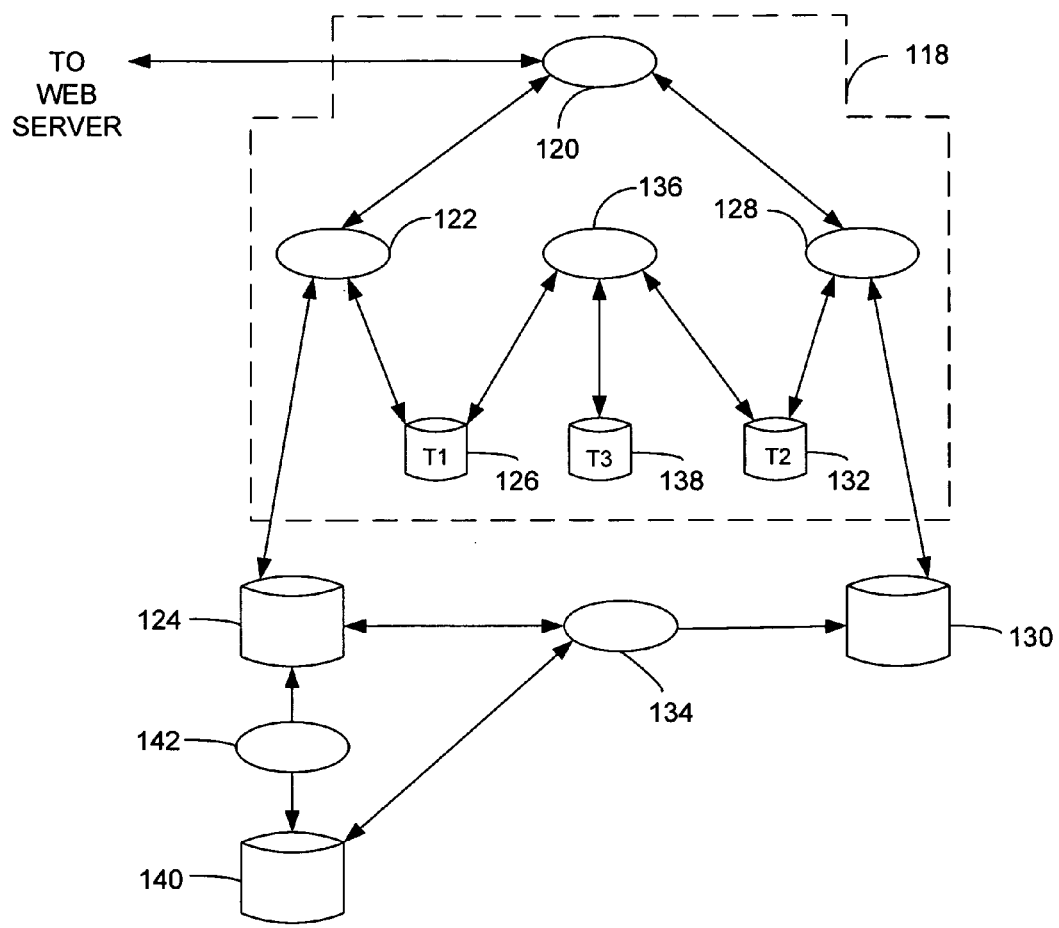
FIG. 2 is an illustrative drawing showing the operation of the keyword recommendation process of FIG. 1.

FIG. 2 is an illustrative drawing showing the operation of the keyword recommendation server, 118 shown within dashed lines. It will be appreciated that the server is implemented as computer software running on one or more computers. The functions of the keyword recommendation server 118 shall be explained in the context of an example user search request consisting of the keyword "restaurant". It is assumed that one of a multitude of user computers represented by internet connected computers 110 has issued a search query over the Internet 104 directed at the web server 106, which passed the query both to the search engine 116 and to the recommendation server 118. The following description primarily addresses the operation of the recommendation server 118. Persons skilled in the art will readily comprehend the operation of the search engine 116, which need not be explained herein.

The recommendation server 118 includes several constituent processes. Upon receipt of the search term "restaurant", a control process 120 initiates a frequency-based search term matching sub-process 122 that searches a frequency database 124 to retrieve to a first table 126 (e.g., a first data structure) a list of previous keywords that contain the search term "restaurant". The frequency database is created as explained below through monitoring of user search requests over a period of time and keeping track of the frequency with which keywords are used to query the search engine 116.

FIGS. 3A-3C is an illustrative drawing of the first table 126 of FIG. 2, which contains example data structures of frequency data for the search term "restaurant". The frequency data concerning the keyword "restaurant" is gathered from a frequency database 124 by the frequency-based search term matching sub-process 122. The keyword "restaurant" is the index to a first data structure, in this example, illustrated as the first table 126. Each search request in the first table 126 is associated with a frequency indicating the number of times the search request was received over a prescribed period of time, such as over the past 30 days, by web server 106. More specifically, the column in the first table 126 labeled "keyword" indicates the search terms identified as containing the search term, "restaurant". The column labeled "frequency" indicates the number of times corresponding search terms were used by prior users over the prescribed time period. For example, "restaurant guide" (the last item in the table) was received 5409 times. Alternatively, rather than store the actual frequency count in the first table 126, the first table 126 could instead have a reference to a frequency count for the keyword stored in the frequency database 124.

The control process 120 also initiates an affinity-based search term correlation sub-process 128 that searches an affinity database 130 to retrieve to a second table 132 a list of previous keywords that have been identified as having an affinity to the search term "restaurant". The second table 132 contains affinity data gathered from the affinity database 130 by sub-process 128. In a present embodiment of the invention the affinity database is created using an affinity analysis process 134 described in U.S. patent application Ser. No. 10/417, 709, filed Apr. 16, 2003, invented by Jagdish Chand, entitled, Affinity Analysis Method and Article of Manufacture, which is expressly incorporated herein by this reference.

FIG. 4 is an illustrative drawing of the second table 132 of FIG. 2, which contains example affinity data for the search term "restaurant". The keyword "restaurant" is the index to the second table 132. Each keyword in the second table 132 is associated with a frequency indicating the number of times the keyword was received by web server 106 over a prescribed period of time. The column labeled "keyword" indicates the search terms identified as having an affinity to "restaurant". The column labeled "frequency" indicates the number of times corresponding keywords were used by other users in the past. For example, the keyword "maps" was received 1,326,684 times during the prescribed period of time. Alternatively, rather than store the actual frequency count in the second table 132, the second table 132 could instead have a reference to a frequency count for the keyword stored in a log file 140.

The control process 118 also initiates a merge sub-process 136 that searches the first and second tables 126, 132 (e.g., first and second data structures) and retrieves to a third table 138 (e.g., a third data structure) an ordered list of recommended keywords as possible alternatives to the keyword "restaurant." The merge sub-process 138 merges and sorts the contents of the first and second tables 126, 138 based upon the frequency information. In a present embodiment, search terms with higher frequency counts are prioritized ahead of search terms with lower frequency counts.

In an alternative embodiment search terms may be sorted based upon weighted frequency values. For instance, in one alternative, the affinity frequencies may be doubled to give affinity data a higher ranking position than the frequency data in the sorted recommendation data.

FIGS. 5A-5C is an illustrative drawing of the third table 138 of FIG. 2, which contains example recommended alternative keywords for the search term "restaurant". The keyword "restaurant" is the index to the third table 138. The third table 138 contains the merged data from the first and second tables 122, 128 in prioritized order based upon frequency. Thus, for example the search term, "japanese restaurant" with a frequency 2765, taken from the example first table 126, the keyword affinity table, is prioritized ahead of search term, "florida restaurant" with frequency 623, taken from the example second table 132, the keyword frequency table. Alternatively, rather than store the actual frequency count in the third table 138, the third table 138 could instead have a reference to a frequency count for the keyword stored in the log file 140.

The control process 120 delivers to the web server 106, the keyword recommendations of the third table 138, the keyword recommendation table, for presentation to the user who submitted the "restaurant" search query as alternative keywords. For example, the recommendation data for the search term "restaurant" may be delivered to the user's computer automatically over the Internet. The user then may elect to try some or all of the recommended alternative keywords, for example.

In a present embodiment, the frequency database 124 and the affinity database 130 are populated and maintained through off-line processes. Search queries comprising search terms are stored in the log file 140, which is periodically analyzed, once a day for example, by a frequency analysis process 142 and the affinity process 134. The frequency analysis process 142 accesses the log file 140 to determine the frequency with which search terms occur. In one embodiment, the frequency analysis process 142 dissects search queries to evaluate them in their entirety and in their constituent parts. For example, the frequency analysis process 142 would dissect the search query, "restaurant guide" into three constituent keywords, "restaurant", "guide" and "restaurant guide", and would increment the counts for each of the three keywords in the frequency database 124.

The affinity process 134 periodically analyzes the log file 140 to evaluate affinities among search terms. The affinity process 134 accesses the frequency database 124 to determine search term frequencies. In one embodiment, affinity is analyzed for keyword search queries as a whole, not their constituent parts. For example, for two search queries, "restaurant" and "michigan dining", an affinity is assessed as between the entire keyword "restaurant" and the entire keyword "michigan dining". In one embodiment, a measure of affinity between the keyword must surpass some prescribed minimum threshold level, to qualify for inclusion in the affinity database 130. In one embodiment, the affinity process 134 stores affinity data in the affinity database 130 according to the teachings of aforementioned U.S. patent application Ser. No. 10/417,709, in order to facilitate fast access to a list of possible alternative keywords with an affinity to a keyword defined by a user search query such as, "restaurant".

The following description addresses aspects of the affinity-based analysis in accordance with an embodiment of the invention. The affinity analysis process 134 may identify a paired association of two keywords with a search object when a first user, of computer 110 for example, provides a first search query with a first keyword to a search engine 116; a second user, of computer 112 for example, provides a second search query with a second keyword to the search engine 116; and both the first and second users select the same given search object. For instance, the search engine 116 returns to the first user's computer 110, in response to the first user's query request, a first web page containing one or more search objects including the given search object. The search engine 116 returns to the second user's computer 112, in response to the second user's query request, a second web page containing one or more search objects including the given search object. The first user selects the given search object appearing on the first web page returned to computer 110. The second user selects the given search object appearing on the second web page returned to computer 112. The first and second keywords have a paired association because each lead to the selection of the same search object.

More specifically, for example, a paired association can be produced as follows. Assume that a first user enters into a web browser keyword search field on computer 108 the search term, "outdoor adventure", and an associated search engine 116 returns a web first page plurality of URLs including a URL for XYZ Sports Stores. It will be appreciated that each different URL is a different search object in this example. Further, assume that a second user enters into a web browser keyword search field on computer 114 the search term, "camping", and an associated search engine returns a second web page with a plurality of URLs including the URL for XYZ Sports Stores. Finally, assume that both the first and the second users select the URL for XYZ Sports Stores. These user actions produce a paired association between the pair of search terms, "outdoor adventure" and "camping".

The affinity based correlation process identifies paired associations by keeping track of relationships between user search terms and user search object selections. Continuing with the above example, the process stores search data indicating that the first user followed an entry of the search term "outdoor adventure" by selection of a search object representing the XYZ Sports Stores URL from the search results presented by the search engine. The process also stores search data indicating that the second user followed an entry of the search term "camping" by selection of a search object representing the XYZ Sports Stores URL from the search results presented by the search engine. In storing the search data, the affinity-based process 134 filters out portions of a search term commonplace terms such as "the", "a" and "an". The process evaluates the stored data concerning the actions of the first and second users in order to identify the common search object or the common URL for XYZ Sports Stores for the search terms "outdoor adventures" and the search term "camping". The process further generates and stores an indication of a correlation between the two terms.

A paired association indicates a possible affinity between the two items. An affinity is a measure of the strength of association between different items. In the context of keywords, an affinity is a measure of the likelihood that a user who selects one keyword is likely to also select another keyword. Generally, an affinity is used as a predictor of user behavior or wants. A strong affinity between two items is a predictor that a user who wants one item is likely to want the other item as well. Likewise, a strong affinity between two keywords is a predictor that a user who uses one of the keywords is likely to be interested in using the other keyword as well. Specifically, in the context of the present invention, for example, an affinity between first and second keywords may be used to predict the likelihood that a person who enters the first keyword into an Internet search engine query field will be interested in entering the second keyword as an alternative search term.

Determining an affinity between two search terms may involve a computation based upon the number of occurrences of the search terms and the number of occurrences of paired associations of the search terms. For example, according to one approach, the affinity for keyword t1 with keyword t2 may employ information concerning:

N(t1): number of times that keyword t1 is used in a search engine request,

N(t2): number of times that keyword t2 is used in a search engine request,

N(t1, t2): number of paired associations of keywords t1 and t2.

The affinity for keyword t1 for keyword t2 may be computed as, $N(t1,t2)/N(t1)$.

Conversely, the affinity for keyword t2 for keyword t1 may be computed as, $N(t1,t2)/N(t2)$.

In a present embodiment of the invention, a novel method of organizing search requests is employed which makes it easier to rapidly perform affinity analyses for large numbers of keywords. In accordance with the method, a unique integer item codes are assigned to individual keywords. Paired associations of keywords are identified. The paired associations are ordered based upon the unique item codes assigned to constituent search terms of the pairs. As a result, each keyword pair is assigned a unique order position relative to the other keyword pairs. A pair order information structure is provided in computer readable medium so as to store associations between keyword pairs and their unique order positions.

The affinity based correlation process employs a threshold frequency count to select keywords to be assigned item codes. For instance, a keyword threshold condition may be imposed that requires that a keyword be present in at least some prescribed minimum threshold number of search engine requests in order to qualify for assignment of an item code. Such keyword threshold frequency count is an optional optimization that seeks to ensure that an item codes are assigned only for keywords that have at least a prescribed minimum level of usage.

The use of integer item codes to represent keywords in conjunction with the use of integer pair codes to represent paired associations of search terms makes possible improvements in organization of information relevant to analysis of relationships among keywords. More specifically, item code information structures and pair code information structures are especially useful in the organization of large amounts of information relevant to relationships between pairs of keywords. The computation of integer pair codes from integer item codes speeds processing involved with evaluating associations among pairs of keywords. This method of organizing search requests for affinity analysis is described in detail in aforementioned co-pending commonly assigned patent application Ser. No. 10/417,709.

Two search terms need not be associated through the same search object to contribute to the measure of affinity. For instance, continuing with the above example, a third user may enter "outdoor adventure" into a search engine; receive from the search engine a third web page with a plurality of URLs; and choose from that third web page a search object representing a URL for ABC National Park. A fourth user may enter, "camping" into a search engine; receive from the search engine a fourth web page with a plurality of URLs; and select from that fourth web page the search object representing a URL for ABC National Park. The affinity analysis process 134 would identify another instance of a pair-wise association between "outdoor adventure" and "camping", this time through the search objects or the URL associated with ABC National Park.

The affinity analysis process 134 also keeps track of the frequency with which each keyword is used in a search engine request. This frequency is compared with the prescribed frequency count threshold to determine which search terms qualify for affinity analysis. Also, as explained below, the frequency also is used in the sorting of recommended search terms to be presented to a user.

It will be understood that the foregoing description and drawings of preferred embodiments in accordance with the present invention are merely illustrative of the principles of the invention. Various modifications can be made by those skilled in the art without departing from the spirit and scope of the invention.

The invention claimed is:

1. A method comprising:

storing, in a computer readable storage medium of a computer, keyword frequency data that indicates the number of times each keyword was received in past user entered internet searches over a prescribed period of time;

storing, prior to the occurrence of a current search being performed by a current user, in the computer readable storage medium, keyword affinity data that indicates affinities between pairs of keywords used in past user entered internet searches, the keyword affinity data based on a selection of a common Universal Resource Locator ("URL") from search results of the past user entered internet searches performed prior to the current search being performed by the current user by both a first user and a second user and using a threshold number of occurrences of search terms and a threshold number of occurrences of paired associations of those search terms;

assigning, via a processor, a unique integer item code to individual keywords;

ordering, via the processor, the pairs of keywords based upon the unique integer item codes assigned to the individual keywords;

identifying, via the processor of the computer, keywords from the keyword frequency data that include a selected keyword;

identifying, via the processor of the computer, keywords from the keyword affinity data that have an affinity to the selected keyword;

prioritizing, via the processor of the computer, the identified keywords based upon the keyword frequency; and communicating, via the processor of the computer, at least a portion of the prioritized identified keywords to the current user as one or more recommended keywords in response to the selected keyword.

2. The method of claim 1,
wherein identifying keywords from the keyword frequency data that include the selected keyword includes searching the keyword frequency data for keywords that include the selected keyword; and
wherein identifying keywords from the keyword affinity data that have an affinity to the selected keyword includes searching the keyword affinity data for keywords that include the selected keyword.

3. The method of claim 1,
wherein identifying keywords from the keyword frequency data that include the selected keyword includes producing a first table that includes a list of keywords that include the selected keyword; and
wherein identifying keywords from the keyword affinity data that have an affinity to the selected keyword includes producing a second table that includes a list of keywords that have an affinity with the selected keyword.

4. The method of claim 1,
wherein identifying keywords from the keyword frequency data that include the selected keyword includes producing a first table that includes a list of keywords that include the selected keyword;
wherein identifying keywords from the keyword affinity data that have an affinity to the selected keyword includes producing a second table that includes a list of keywords that have an affinity with the selected keyword;
wherein prioritizing the identified keywords includes associating frequency counts from the frequency data with keywords in the first table; and
wherein prioritizing the identified keywords includes associating frequency counts from the frequency data with keywords in the second table.

5. The method of claim 1,
wherein prioritizing the identified keywords includes ordering the keywords identified from the keyword frequency data according to the frequency counts indicated by the frequency data; and
wherein prioritizing the identified keywords includes ordering the keywords identified from the keyword affinity data as having an affinity to the selected keyword according to the frequency counts indicated by the frequency data.

6. The method of claim 1,
wherein prioritizing the identified keywords includes producing a data structure in which identified keywords from the frequency data and from the affinity data are ordered according to the frequency counts indicated by the frequency data.

7. The method of claim 1,
wherein identifying keywords from the keyword frequency data that include the selected keyword includes producing a first list that includes a list of keywords that include the selected keyword;
wherein identifying keywords from the keyword affinity data that have an affinity to the selected keyword includes producing a second list that includes a list of keywords that have an affinity with the selected keyword; and
wherein prioritizing identified keywords includes producing a third list in which identified keywords from the first list and from the second list are merged together and ordered according to the frequency counts indicated by the frequency data.

8. The method of claim 1, further comprising
receiving a user-provided search request that includes the selected keyword; and
providing the prioritized identified keywords to the user who provided the search request.

9. The method of claim 1,
wherein prioritizing the identified keywords includes producing a table in which identified keywords from the frequency data and from the affinity data are merged together and ordered according to the frequency counts indicated by the frequency data; and
further comprising the steps of:
receiving a user-provided search request that includes the selected keyword; and
providing the identified keywords, as ordered in the table, to the user who provided the search request.

10. The method of claim 1,
wherein receiving a user-provided search request involves receiving a request communicated by the user over the internet; and
wherein communicating the identified keywords involves communicating the request to the user over the internet.

11. A method comprising:
receiving, by a computing device, a user-provided search request that comprises a user indicated keyword;
storing, by the computing device, keyword frequency data that indicate the number of times each keyword was received in past user-entered internet searches over a prescribed period of time;
storing, prior to the occurrence of a current search being performed by a current user, by the computing device, keyword affinity data that indicate affinities between pairs of keywords used in past user-entered internet searches, the keyword affinity data based on a selection of a common Universal Resource Locator ("URL") from search results of the past user internet searches performed prior to the current search being performed by the current user by both a first user and a second user and using a threshold number of occurrences of search terms and a threshold number of occurrences of paired associations of those search terms;
assigning, by the computing device, a unique integer item code to individual keywords;
ordering, by the computing device, the pairs of keywords based upon the unique integer item codes assigned to the individual keywords;
searching, by the computing device, the keyword frequency data to identify keywords that include the user indicated keyword;
searching, by the computing device, the keyword affinity data to identify keywords that have an affinity to the user indicated keyword;
producing, by the computing device, a data structure in which identified keywords from the frequency data and from the affinity data are ordered according to frequency counts indicated by the frequency data; and
transmitting, by the computing device, the ordered identified keywords to the current user.

12. A non-transitory computer readable storage medium encoded with computer readable code for execution by a processor, the computer readable code comprising:
keyword frequency data that indicate the number of times each keyword was received in past user-entered internet searches over a prescribed period of time;
keyword affinity data that indicate affinities between pairs of keywords used in past user-entered internet searches;

storing means for storing, prior to the occurrence of a current search being performed by a current user, the keyword affinity data;

computer code means for using a selected keyword to identify keywords from the keyword frequency data that include the selected keyword;

computer code means for using the selected keyword to identify keywords from the keyword affinity data that have an affinity to the selected keyword, the keyword affinity data based on a selection of a common Universal Resource Locator ("URL") from search results of the past user-entered internet searches performed prior to the current search being performed by a current user by both a first user and a second user and using a threshold number of occurrences of search terms and a threshold number of occurrences of paired associations of those search terms;

computer code means for assigning a unique integer item code to individual keywords;

computer code means for ordering the pairs of keywords based upon the unique integer item codes assigned to the individual keywords;

computer code means for using the keyword frequency data to prioritize the identified keywords; and computer code means for causing communication of at least one of the prioritized identified keywords to the current user.

13. The non-transitory computer readable storage medium of claim 12 further including:

computer code means for receiving a user-provided search request that includes the user selected keyword; and computer code means for providing the ordered identified keywords to the user.

14. A non-transitory computer readable storage medium encoded with computer readable code for execution by a processor, the computer readable code comprising:

keyword frequency data media that indicate the number of times each keyword was received in past user-entered internet searches;

storing means for storing, prior to the occurrence of a current search being performed by a current user, the keyword affinity data;

keyword affinity data that indicate affinities between pairs of keywords used in past user-entered internet searches, the keyword affinity data based on a selection of a common Universal Resource Locator ("URL") from search results of the past user internet searches performed prior to the current search being performed by a current user by both a first user and a second user over a prescribed period of time and using a threshold number of occurrences of search terms and a threshold number of occurrences of paired associations of those search terms;

computer code means for assigning a unique integer item code to individual keywords;

computer code means for ordering the pairs of keywords based upon the unique integer item codes assigned to the individual keywords;

computer code means for searching the keyword frequency data to identify keywords that include a selected keyword and for producing a first list that includes a list of keywords that include a selected keyword;

computer code means for searching the keyword affinity data to identify keywords that have an affinity to the selected keyword and for producing a second list that includes a list of keywords that have an affinity with the selected keyword;

computer code means for producing a third list in which identified keywords from the first list and from the second list are merged together and ordered according to the frequency counts indicated by the frequency data; and computer code means for causing communication of at least one of the prioritized identified keywords to the current user.

15. The non-transitory computer readable storage medium of claim 14 further including:

computer code means for receiving a user-provided search request that includes the user selected keyword; and computer code means for providing the ordered identified keywords to the user.

16. A method comprising:

receiving, by a processor, a user-provided search request that includes a user indicated keyword;

storing, by the processor, keyword frequency data in computer readable storage media that indicate the number of times each keyword was received in past user-entered internet searches over a prescribed period of time;

storing, prior to the occurrence of a current search being performed by a current user, by the processor, keyword affinity data in the computer readable storage media that indicate affinities between pairs of keywords used in past user-entered internet searches, the affinity data based upon a selection of a common Universal Resource Locator ("URL") from search results of the past user-entered internet searches performed prior to the current search being performed by a current user by both a first user and a second user and a threshold number of occurrences of search terms and a threshold number of occurrences of paired associations of those search terms;

assigning, by the processor, a unique integer item code to individual keywords;

ordering, by the processor, the pairs of keywords based upon the unique integer item codes assigned to the individual keywords;

searching, by the processor, the keyword frequency data to identify keywords from that include the user indicated keyword;

searching, by the processor, the keyword affinity data to identify keywords that have an affinity to the user indicated keyword;

producing, by the processor, a data structure in which identified keywords from the frequency data and from the affinity data are ordered according to frequency counts indicated by the frequency data;

providing, by the processor to the user, a list of one or more web pages that satisfy the user-provided search request; and providing, by the processor to the current user, the ordered identified keywords.

17. A system comprising:

a computer implemented web server that retrieves one or more web pages in response to a user search request that includes a user-indicated keyword;

keyword frequency data stored in computer readable storage media that indicate the number of times each keyword was received in past user-entered internet searches over a prescribed period of time;

keyword affinity data stored, prior to the occurrence of a current search being performed by a current user, in computer readable storage media, that indicate affinities between pairs of keywords used in past user-entered internet searches, the affinity data based upon a selection of a common Universal Resource Locator ("URL") from search results of the past user-entered internet searches performed prior to the current search being performed by a current user by both a first user and a second user and using a threshold number of occurrences of search terms and a threshold number of occurrences of paired associations of those search terms;

a keyword recommendation server that is coupled to communicate with the web server and that, assigns a unique integer item code to individual keywords;

orders the pairs of keywords based upon the unique integer item codes assigned to the individual keywords;

searches the keyword frequency data to identify keywords that include the user-indicated keyword, searches the keyword affinity data to identify keywords that have an affinity to the user-indicated keyword, prioritizes the identified keywords from the frequency data and from the affinity data according to frequency counts indicated by the frequency data, and causes communication of at least one of the prioritized identified keywords to the current user.

18. The system of claim 17, wherein the server produces a first table that includes a list of keywords from the keyword frequency data that include the user-indicated keyword; and wherein the server produces a second table that includes a list of keywords from the affinity data that have an affinity with the selected keyword.

19. The system of claim 17, wherein the server produces a list of identified keywords from the keyword frequency data that include the user-indicated keyword;

wherein the server produces a list of identified keywords from the affinity data that have an affinity with the selected keyword;

wherein the server prioritizes identified keywords from the keyword frequency data by associating frequency counts from the frequency data with keywords in the first list; and wherein the server prioritizes identified keywords from the affinity data by associating frequency counts from the frequency data with keywords in the second list.

20. The system of claim 17, wherein the server produces a list of identified keywords from the keyword frequency data that include the user-indicated keyword;

wherein the server produces a list of identified keywords from the affinity data that have an affinity with the selected keyword; and wherein the server prioritizes identified keywords by producing a third list in which identified keywords from the frequency data and from the affinity data are merged together and ordered according to the frequency counts indicated by the frequency data.

21. The system of claim 17 further including: an internet search engine coupled to communicate with the web server.

* * * * *